(12) United States Patent
Rajaram et al.

(10) Patent No.: US 7,603,662 B2
(45) Date of Patent: Oct. 13, 2009

(54) SYSTEM AND METHOD FOR SENSING TYPES OF LOCAL VARIABLES

(75) Inventors: Sadagopan Rajaram, Secunderaban (IN); Nikhil Jain, New Delhi (IN)

(73) Assignee: Microsoft Corporation, Redmond ( * ) Notice: Subject to any disclaimer, the term of this patent is extended or adjusted under 35 U.S.C. 154(b) by 581 days.

(21) Appl. No.: 10/413,840

(22) Filed: Apr. 14, 2003

(65) Prior Publication Data
US 2004/0073893 A1 Apr. 15, 2004

Related U.S. Application Data

(60) Provisional application No. 60/417,718, filed on Oct. 9, 2002.

(51) Int. Cl.
*G06F 9/45* (2006.01)
(52) U.S. Cl. .................. 717/146; 717/154; 717/159
(58) Field of Classification Search ................. 717/136, 717/137; 713/194
See application file for complete search history.

(56) References Cited

U.S. PATENT DOCUMENTS 6,438,745 B1 * 8/2002 Kanamaru et al. .......... 717/137
6,668,325 B1 * 12/2003 Collberg et al. ............. 713/194
6,738,967 B1 * 5/2004 Radigan ..................... 717/146
6,981,249 B1 * 12/2005 Knoblock et al. ........... 717/141

OTHER PUBLICATIONS

"A type system for certified binaries", Shao et al., Jan. 2002, pp. 217-232. Online retrieved at <http://delivery.acm.org/10.1145/510000/503293/p217-shao.pdf>.*
"Deciding type equivalence in a language with singleton kinds", Stone et al., Dec. 2000, pp. 214-227. Online retrieved at <http://delivery.acm.org/10.1145/330000/325724/p214-stone.pdf>.*

* cited by examiner

*Primary Examiner*—Tuan Q Dam
*Assistant Examiner*—Thuy Dao
(74) *Attorney, Agent, or Firm*—Woodcock Washburn LLP (57) ABSTRACT

Intermediate code is executable on a virtual machine. Hence, source code that is compiled on a first computing device can be distributed to a second computing device in an intermediate form as long as the second computing device has the appropriate virtual machine. In this way, the compilation can be done without regard to the underlying native processor on the second computing device. However, the intermediate code loses the original type information defined in the source code. By determining the variable types in the intermediate code, the intermediate code can be converted to a different intermediate language.

23 Claims, 6 Drawing Sheets

SYSTEM AND METHOD FOR SENSING TYPES OF LOCAL VARIABLES

CROSS REFERENCES TO RELATED APPLICATION

This application claims the benefit of U.S. Provisional Application No. 60/417,718, filed Oct. 9, 2002.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the patent and Trademark Office patent files or records, but otherwise reserves all copyright rights whatsoever. The following notice shall apply to this document Copyright© 2003, Microsoft Corp.

FIELD OF THE INVENTION

The present invention relates generally to the field of computing. More particularly, the invention relates to a system and method for conversion of software code.

BACKGROUND OF THE INVENTION

A common programming paradigm is to compile code at runtime. A just-in-time (JIT) compiler is an example of such as system. Other systems that compile at runtime include continuous compilation systems that immediately begin execution in an interpretive state but compile the code over time and continuously optimize the compilation. With JIT compilers, as classes are loaded into the virtual machine (VM), the method pointers in the virtual method table are replaced with pointers to the JIT compiler. Then, the first time each method is called, the JIT compiler is invoked to compile the method. The pointer in the virtual method table is then patched to point to the native-code version of the method so that future calls to the method will jump to the native-code. These JIT compiler systems have the advantage of transmitting code to a target machine in an intermediate language (IL) such as JAVA bytecodes, common language runtime (CLR) instructions, and so on. The compiler is designed to convert the IL into instructions executable by the native processor. As a result, the same IL instructions can be sent to computers having different native processors and execute nonetheless on the target processor.

Such portable code has become popular. In this model, the code that is generated follows a set of rules and the execution engine (at a remote site) can verify that the code follows these rules. One of these rules is that the code should be verifiable, i.e. it is possible to assert the types of the objects on stack at all times during the execution of the code. This rule is a direct by-product of the Object Oriented Programming language constraints where the generated code has type information, unlike native code. Hence typically all Object Oriented Programming languages would have a concept of verifiability of generated code.

With the introduction of a variety of different virtual machines (VM), it is sometimes necessary for one execution engine to run code that is written for another virtual machine. However, the constraints imposed by one virtual machine may differ from another. In some versions of VM (like JAVA™ VM), local variables used in method implementation can be reused once the local variable goes out of scope i.e. the same variable number in different contexts could mean different types in the compiled code and could hence refer to different local variables in the source code. Also the compiled code need not have the information about the types of a local variable in different scopes. In some other VM, having more restrictive constraints, a local variable can be used to represent only one type and may not be reused.

SUMMARY OF THE INVENTION

The invention provides methods, systems and computer readable medium for converting computer readable instructions from one computer language to another computer language. Initially, a set of computer readable instructions in a first, verifiable computer language is provided that needs to be converted for use in an environment for executing computer instructions in a second computer language. For example, computer instructions that are written in JAVA and are ready for execution on a JAVA VM may need to be converted into an intermediate language that can execute on a computing device having an execution engine that does not recognize JAVA bytecode.

In order to facilitate the conversion, variables must be defined for the new computing language. The variables correspond to the variables determined from the first intermediate language code. In general, the variable type information is determined (or inferred) from the operations performed by the first set of computer readable instructions. That is, by examining how data is pushed on or off of a stack or loaded into memory, proper variable types can be determined for the converted computer instructions.

Thereafter, the set of computer readable instructions from the first computer language that operate on the variables in the first computer language are converted to a second set of computer readable instructions that operate on the converted variables in a second computer language. The converted computer instructions can then be executed on a second type of virtual machine, i.e. a virtual machine that could not recognize or execute the original computer readable instructions.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Distributed computing facilitates sharing of computer resources and services by direct exchange between computing devices and systems. The introduction of virtual machines, code can be exchanged between computing facilities, where the code is compiled in one computer and executed on another. With the proliferation of VM flavors, e.g., Java, CLR, etc, it has become desirable for one VM to be able to execute code that was written for another virtual machine. The invention facilitates that execution on various virtual machines by providing a mechanism for detecting variable types in the verifiable code.

Network Services Framework

Network Services (e.g., .NET Framework) provide a computing framework that is developing in light of the convergence of personal computing and the Internet. Individuals and business users alike are provided with a seamlessly interoperable and network-enabled interface for applications and computing devices, making computing activities increasingly browser or network-oriented. In general, a Network Services platform includes servers, building-block services, such as Web-based data storage and downloadable device software.

Generally speaking, the such service provide (1) the ability to make the entire range of computing devices work together and to have user information automatically updated and synchronized on all of them, (2) increased interactive and interoperative capability for network computers, enabled by greater use of extensible markup language (XML) and VM technologies, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a server and/or client computer, portions of the invention may also be implemented via an operating system or a "middle man" object between a network and device or object, such that services may be described in, supported in or accessed via any number of languages and services.

Figure 1:
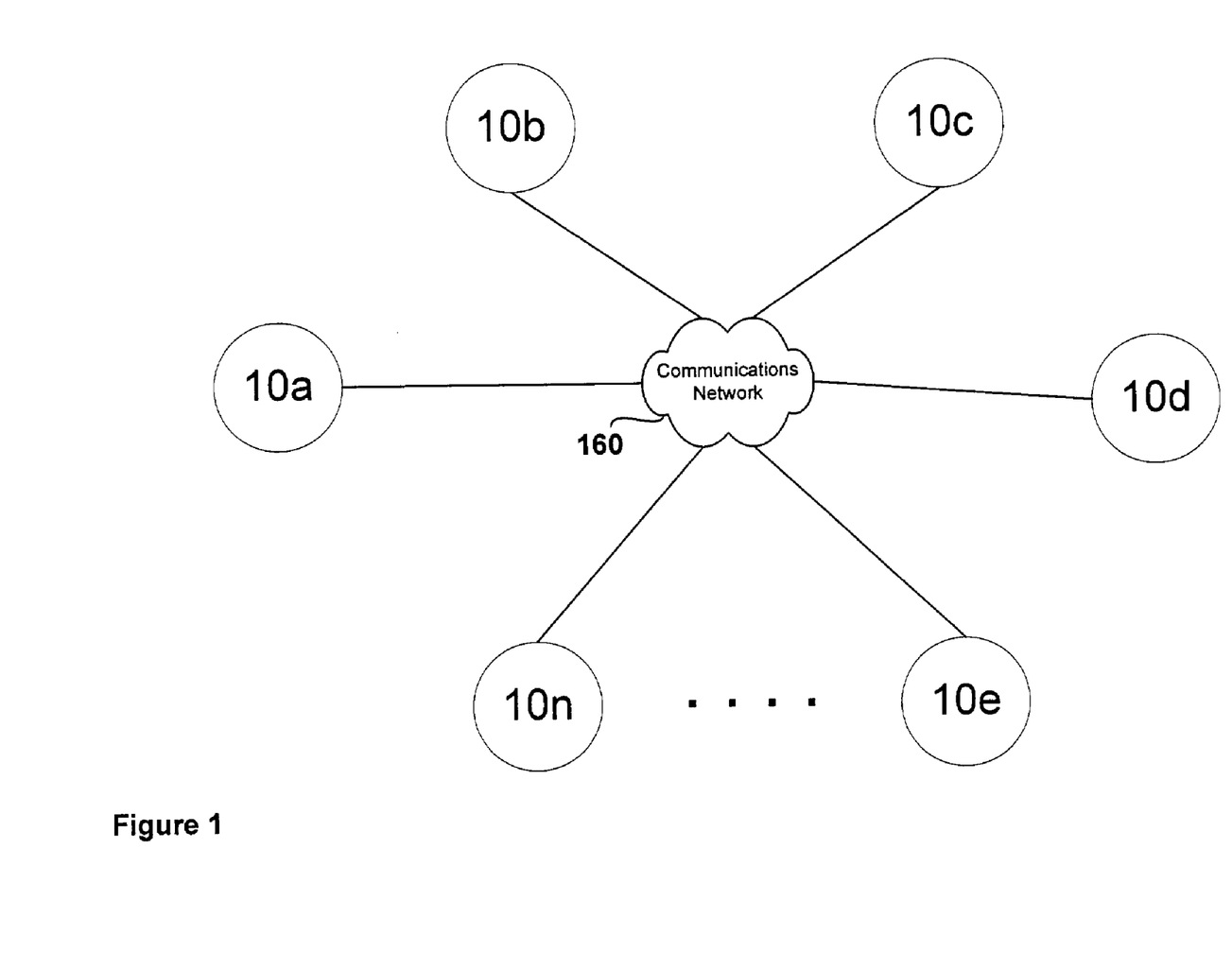
FIG. 1 is a diagram of an exemplary distributed system in which various objects communicate with each other in a communications network.

FIG. 1 provides a schematic diagram of a distributed computing environment such as may be applicable in a Network Services environment. The computing environment comprises computing objects 10A-10n. These objects may comprise programs, methods, data stores, programmable logic, etc. The objects comprise portions of the same or different devices such as PDAs, televisions, MP3 players, Televisions, personal computers, etc. Each object can communicate with another object by way of the communications network 160. This network may itself comprise other computing objects and computing devices that provide services to the system of FIG. 1. In accordance with an aspect of the invention each object 10a-10n may contain a VM that enables it to execute code that was compiled on a different object 10a-10n. Moreover, it may be desirable for objects 10a-10n to have the capability to execute code written for a variety of VMs. In accordance with an aspect of the invention, that capability is facilitated by converting code destined for one VM format without type information to code for another VM format by determining the local variable types of the code by applying rules of inference.

Computing Environment

Figure 2:
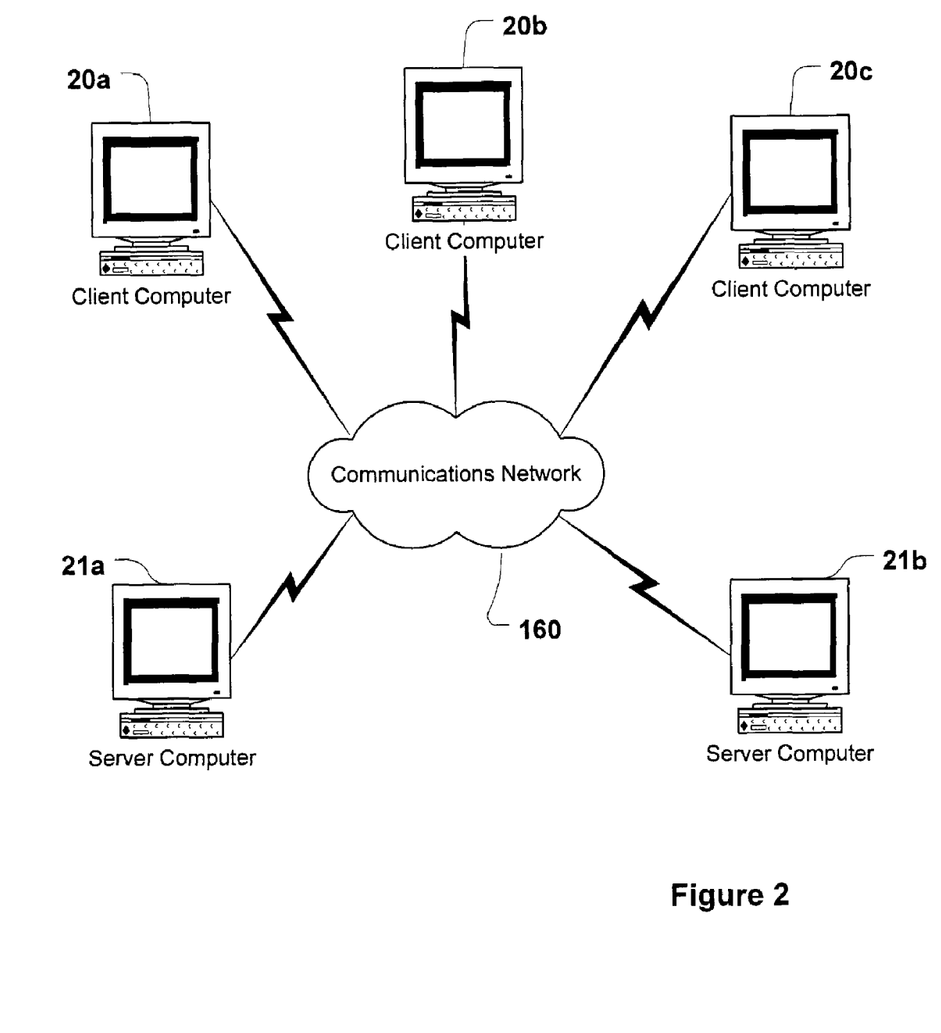
FIG. 2 is an example of a computer network wherein aspects of the present invention may be employed.

FIG. 2 illustrates how the objects of FIG. 1 may be implemented in a physical environment. Here computers 20a-20c and 21a-21b may host various ones of the objects of FIG. 1. Although the physical environment shows the connected devices as computers, such illustration is merely exemplary and may comprise various digital devices such as PDAs, televisions, MP3 players, etc. Moreover, communications network 160 may itself comprise a number of computers and network devices such as routers and the like, which also may be capable of hosting objects 10 and/or providing services to objects 10.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The Internet commonly refers to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In client/server architecture, particularly a networked system, a client is usually a computer that accesses shared network resources provided by another computer (i.e., a server). In the example of FIG. 1, computer 20 can be thought of as the client and computer 10 can be thought of as the server where server 10 maintains the data that is then replicated in the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Illustrative Computer Network Environment

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

In the network system, contracts between programmatic endpoints are formed using a universally agreed upon type system. However, it is very easy to confuse syntax with semantics at the type system level because there are many syntactic flavors such a component object model (COM), CLR, and Java VM for expressing the same type system concepts. The network system takes the approach that all type systems flavors have the same constructs at the semantic level. Every type system has two aspects: Data aspect and behavior aspect. When an endpoint X sends Message M to endpoint Y to carry out action A, the Message M contains the data useful for carrying out the desired Action A. The data aspect is used for describing Message M and the behavior aspect is used for describing Action A and its relationship with Message M.

Portable code (code that is compiled at one place and executed at another) has become popular with the introduction of VM technologies. In this model, the code that is generated follows a set of rules and the execution engine (at the remote site) can verify that the code follows these rules. With the introduction of various flavors of virtual machines (VM) (like the Java, Jini, .NET framework, Inferno, etc.), it is sometimes necessary for one execution engine to run code that is written for another virtual machine. However, the constraints imposed by one virtual machine may differ from another. In some versions of VM (like JAVA VM), local variables used in method implementation can be reused once the local variable goes out of scope i.e., the same variable in different contexts could mean different types in the compiled code. Also the compiled code need not have the information about the type of a local variable. In some other VM however a local variable can be used to represent only one type and may not be reused. So, when converting from one execution engine format to another, it becomes imperative to infer the type information of local variables from the original portable code.

Figure 3:
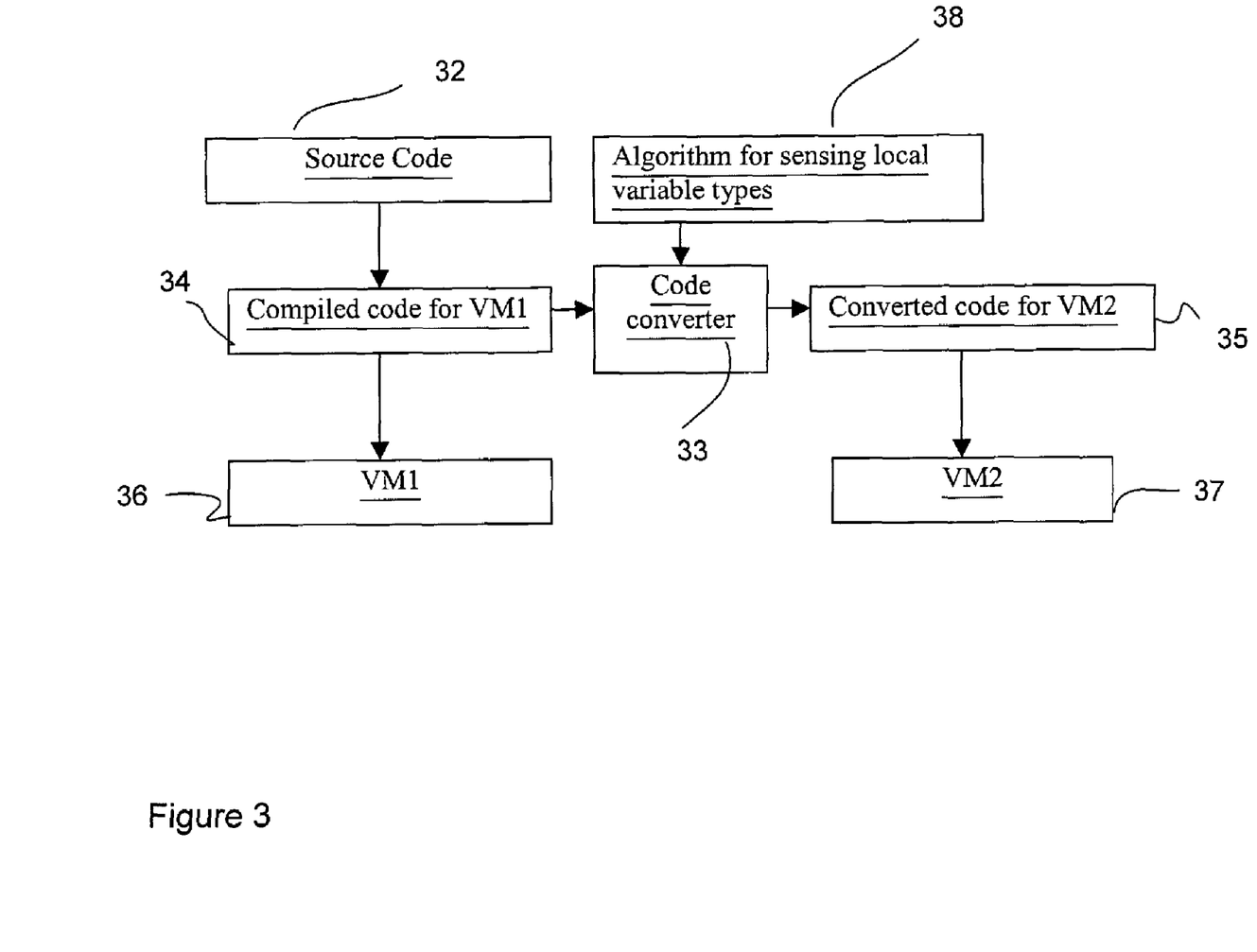
FIG. 3 is a block diagram depicting the flow of intermediate code through a system incorporating aspects of the invention.

FIG. 3 provides an overview of the operation of the present invention. In this example, source code 32 represents the source code written in a portable code language such as Java or CLR. The source code 32 is then compiled by the compiler for the underlying language. The compiler generates intermediate language code or, in the case of Java, bytecode, 34. The intermediate language code 34 can then be distributed, e.g., across a network such as the network described with respect to FIG. 2. This intermediate code 34 could then run on a target computing device, e.g., 20a, 20b that has the appropriate virtual machine VM1 as indicate by box 36. Alternatively, the intermediate code 34 could go through a conversion process in accordance with an aspect of the invention, as indicated by box 33 and be converted to code executable by virtual machine 2, VM2, at box 35. The converted code 35 could then run on virtual machine 37, VM2. However, because the code is in an intermediate format, the original type information is not available. As a result, an aspect of the code conversion is a method for sensing the local variable types as indicated at box 38 by inferring the type information and as described more fully below.

Figure 4:
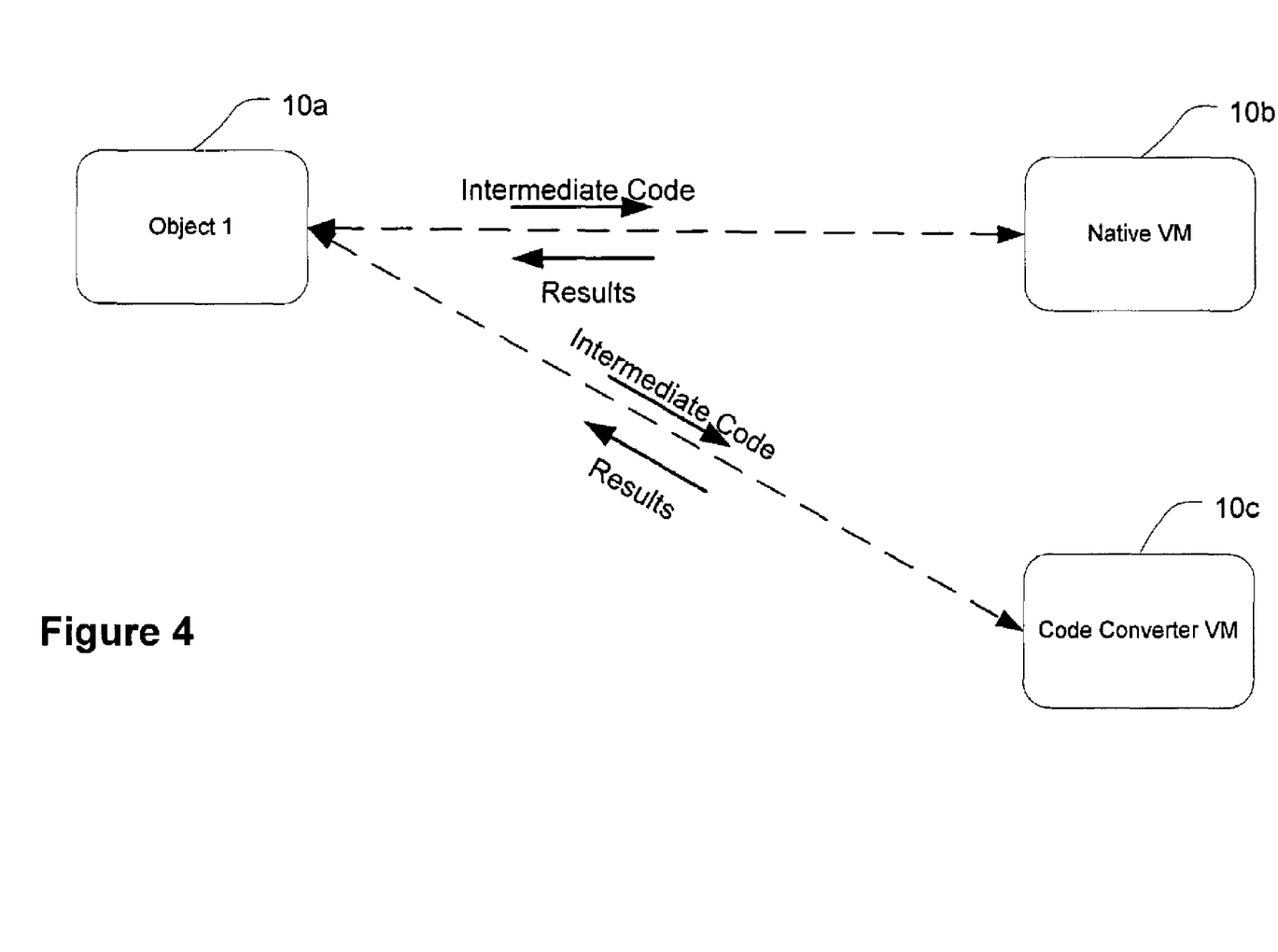
FIG. 4 depicts the transfer of intermediate code among objects in a distributed system.

As indicate in FIG. 4, using the above technique intermediate code (e.g., 34) can distributed from an object e.g., 10a across a network to other objects, e.g., 10b, 10c. The object receiving the intermediate code could then execute the intermediate code if the object has a native VM, such as object 10c or first apply the type sensing to convert the code and then execute it on a non-native VM, e.g., 10b.

The code converter 33, described more fully below, can be used to decipher the type information about local variables from a verifiable code to perform the conversion of code written for one VM (e.g., VM1 36) to equivalent code to be executed on another VM (e.g., VM2 37).

Code written for portable languages such as JAVA or CLR is by definition verifiable. Generally, the target VM for such languages uses a JIT process to verify the code (e.g., 34) before execution. Since the intermediate code 34 is verifiable, all execution paths that lead to the instructions in the code must be consistent. The type of the local variable when a particular instruction is executed is always the same irrespective of the execution sequence followed. (There are other common rules for verifiability of intermediate code, but this is the one is leveraged in the present approach to simplify the inference process).

An additional feature of such intermediate code languages is that a store instruction erases all information about the local variable collected till that store. This is so because the local variable assumes the new type from that store instruction and that is used in subsequent execution paths.

A local variable load instruction must load a defined type on top of stack for the code to be verifiable. Hence, all stores for this local variable location which could have preceded this load instruction in the execution code path and which were the last stores for this local variable location before this local variable load instruction must refer to the same type i.e., the same local variable on the new and the old VM.

Code Conversion

There are several different instruction types that appear in intermediate code. In general, all of the intermediate code languages are stack based and have instructions that fall within one of the following four categories:

Instruction Types

| | |
|---|---|
| Type 1 | Add a type on top of stack - the type can always be inferred from the information associated with the instruction. |
| Type 2 | Remove some types from the stack. |
| Type 3 | Use some types on top of stack - these are the instructions that either give information about what was on top of stack like a method call instruction or about the type of the destination like a store instruction. |
| Type 4 | Instructions that do not affect the stack. |

Figure 5:
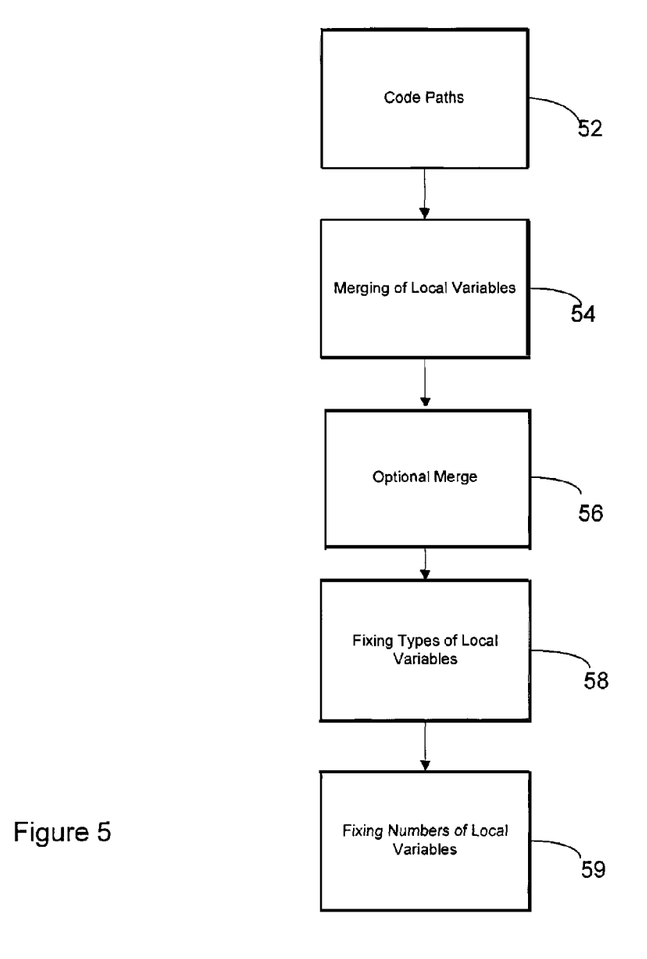
FIG. 5 is a flow chart depicting the method of converting intermediate code for use on one VM for use on another VM.

Given that the instructions in the intermediate code fall in to one of the above categories, the method as illustrated in connection with FIG. 5 is used to decipher the type information so that the intermediate code can be converted to operate on a different virtual machine.

1. Code Paths (block 52)
    Traverse the code following all code paths doing the following:
    a) Create a new local variable for each local variable store instruction. For each local variable maintain the possible least derived and most derived types of the local variable inferred from the store instruction.
    b) Use all Type 3 instructions to update the type of a local variable. For e.g. if a local variable gets loaded on top of stack and method of class "A" is called on it, the type of the local variable must be either "A" or a derived type of "A".
    c) Create a tree for the code instructions that can be traversed backwards. All nodes which refer to an instruction, that created a new local variable, have a reference to the local variable.
2. Merging of local variables (block 54)
    For each local variable load instruction, traverse the code tree backwards to find all immediate preceding stores in the code tree for this local variable number. All the local variables associated with the store instructions refer to the same local variable on the new VM and the type of this local variable must be inferred from the merge of the types of these local variables. (Each local variable is associated with a least derived type and a most derived type. Merging two local variable means finding the most derived type that lies within the hierarchy of the least and most derived types of the two local variables). If the merge of local variables fails, it implies that the code is not verifiable.
3. Optional Merge (block 56)
    Once we have gone through all the load instructions we have the set of local variables with their type information on the new VM. This set could be further reduced by trying to merge the different local variables created for the same local variable number on the original VM. Here the merge might fail which implies that the local variables cannot be merged
4. Fixing types of local variables (block 58)
    Each local variable has a least derived type and a most derived type associated with it. Fix the type of the local variable as the most derived type. Note that this is not a must. The type could actually be fixed as any type that lies within the hierarchy of least derived type and the most derived type.
5. Fixing numbers of local variables (block 59)
    When some local variables get merged, some local variable numbers become redundant. So the local variables should be renumbered so that there are no dummy/blank local variables.

The following examples further illustrate the operation of the code conversion method in accordance with the present invention.

EXAMPLES

Assume the following class structure:

class A { public virtual void am( ) { } } class B: A { public virtual void bm( ) { } } class X { }

Nomenclature

VM (Y, Z, N)—variable number M has the least derived type as Y and the most derived type as Z. This means that the actual type of this variable can be any type T where T is assignable from Y and Y is assignable from Z. N is the variable number in the compiled code for the first VM.

VM (VL, N)—variable number M is dependent upon variable number L. This means that the type of the local variable M declared for the new VM must be assignable from the type of the local variable L.

VM (X)—variable number M is defined as of type X on the new VM.

Following examples have code written in pseudo language

Example 1

Code 1. new B
2. storeVar 0
3. loadVar 0
4. callMethod A.am
5. return

Application of Algorithm Illustrated in Connection with FIG. 5

1. The Code Path is determined, i.e. any branches, jumps, etc. are used to generate all of the possible paths through the code. In this example, there are no branches. Hence, the code is executed in the following order: 1-2-3-4-5.
    At instruction 2, variable, V0, has a least derived type of unknown and a most derived type of B. The complied variable number is 0. This is expressed as:
    Instruction 2→V0 (unknown, B, 0)
    At instruction 4, it can be determined that the least derived type is A. Thus, variable, V0, can be expressed as:
    Instruction 4→V0 (A, B, 0)
2. The second step is to merge local variables. To that end, for each local variable load instruction, the code paths are traversed backwards to find all immediate preceding stores in the code path for this local variable number. In this example, there is only V0. Hence, there are no local variable to merge.
3. The set of local variable determined in step 2 can be further merged; however, here we have only a single local variable. Hence, there are no variables to merge.

4. Fixing types of local variables:
   Note that in this case, the local variable can be defined as anything from least derived to most derived and the code will be verifiable—so in this case local variable can be of type A or B. We fix it to the most derived type i.e., B
5. Fixing numbers of local variables. There is only one, V0. Hence, there is nothing to do in this step.
6. Result: V0 (B)

Example 2

Code 1. new A
2. storeVar 0
3. new A
4. loadVar 0
5. branchIfNull, instruction 7
6. new B
7. storeVar 1
8. new X
9. storeVar 0
10. return Application of Algorithm
  1. Code paths:
     a) 1-2-3-4-5-6-7-8-9
        Instruction 2→V0 (unknown, A, 0)
        Instruction 7→V1 (unknown, B, 1)
        Instruction 9→V2 (unknown, X, 0)
     b) 1-2-3-4-5-7-8-9
        Instruction 2→V0 (unknown, A, 0)
        Instruction 7→V1 (unknown, A, 1)//Note that the most derived type gets reduced to A from B
        Instruction 9→V2 (unknown, X, 0)
  2. Merging of local variables: N.A.
  3. Optional Merge:
     Now try to merge V0 and V2. Since A is not assignable from X and X is not assignable from A, the two variables cannot be merged.
  4. Fixing types of local variables: fix as the most derived type
  5. Fixing numbers of local variables: N.A.
  6. Result: V0 (A), V1 (A), V2 (X)

Example 3

Code 1. new A
2. storeVar 0
3. loadVar 0
4. branchIfNull, instruction 7
5. new B
6. storeVar 0
7. loadVar 0
8. stroreVar 1
9. return Application of Algorithm
  1. Code paths:
     a) 1-2-3-4-5-6-7-8-9
        Instruction 2→V0 (unknown, A, 0)
        Instruction 6→V1 (unknown, B, 0)
        Instruction 8→V2 (V1, 1)
     b) 1-2-3-4-7-8-9
        Instruction 2→V1 (unknown, A, 0)
        Instruction 8→V2 (V1, 1)
  2. Merging of local variables:
     Instruction 7 →V0 and V1 must merge as these are the two immediate stores before the load considering all code paths. Hence the local variable information becomes:
     V0 (unknown, A, 0)
     V2 (V0, 1)
  3. Optional Merge: N.A.
     Now try to merge V0 and V2. Since A is not assignable from X and X is not assignable from A, the two variables cannot be merged.
  4. Fixing types of local variables: fix as the most derived type
  5. Fixing numbers of local variables: V0→V0, V2→V1.
  6. Result: V0 (A), V0 (A)//note that only instruction 8 refers to V1 and all others refer to V0.

Figure 6:
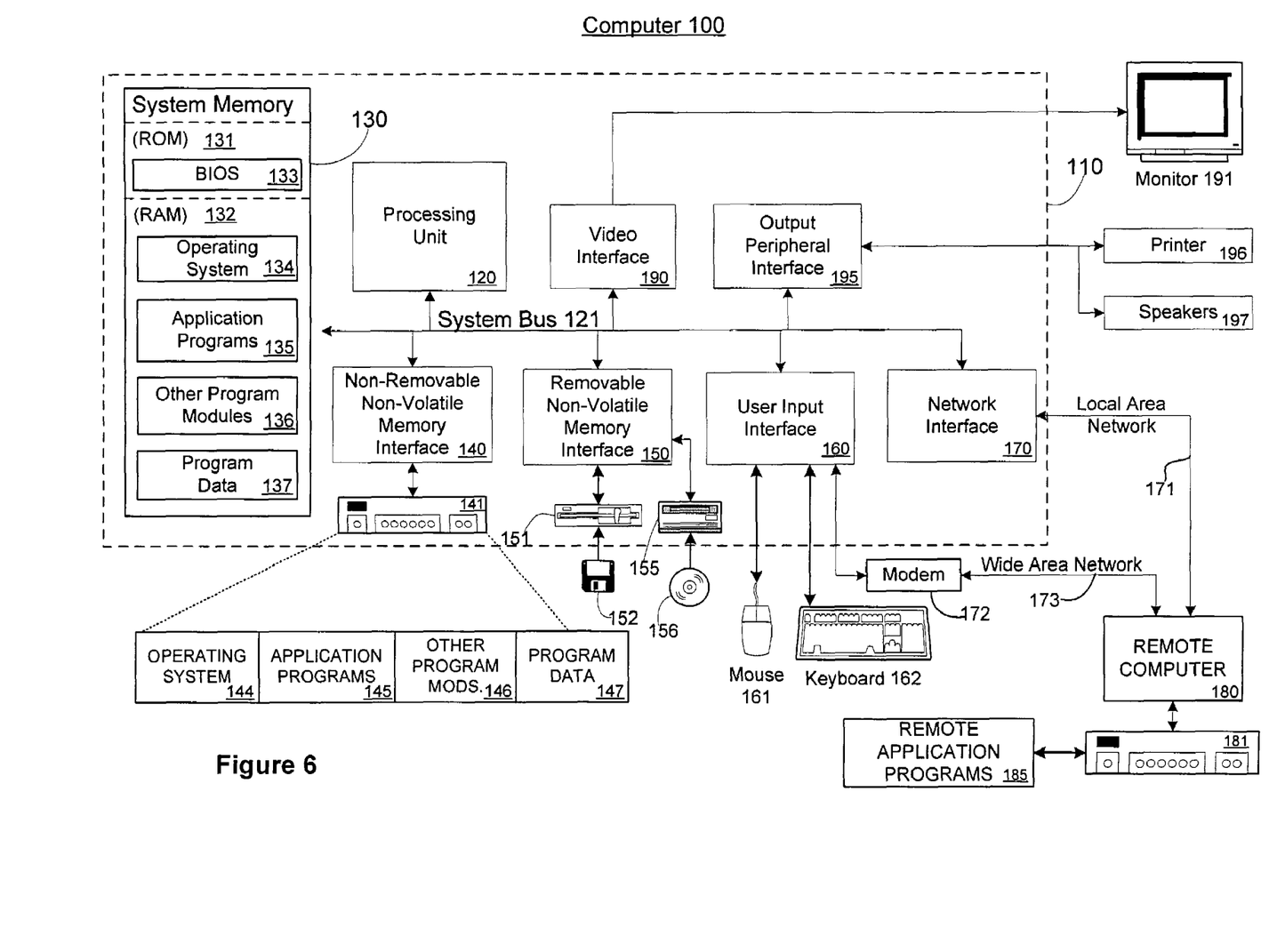
FIG. 6 is a block diagram of an exemplary computing environment in which aspects of the invention may be implemented.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, DVD players, VCRs, home appliances, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method of converting computer readable instructions, comprising:
receiving a first set of computer readable instructions in a first, verifiable computer language, said first, verifiable computer language having variables;
determining the type of a converted variable for use in a second computer language that has a type determined from the operations performed by the first set of computer readable instructions; and
converting the first set of computer readable instructions from the first computer language that operate on the variables in the first computer language to a second set of computer readable instructions that operate on the converted variables in the second computer language wherein the second computer language is different from the first computer language and wherein said converting comprises traversing the first set of computer readable instructions, merging local variables contained in said first set of computer readable instructions, fixing the types of the local variables and fixing the number of local variables wherein each local variable is associated with a most derived type and a least derived type and wherein merging two local variables comprises finding and selecting the most derived type within the least derived types and most derived types of said two local variables.

2. The method of claim 1 wherein the set of first computer language comprises an intermediate language.

3. The method of claim 2 wherein the intermediate language instructions comprise bytecode.

4. The method as recited in claim 2 wherein the intermediate language instructions are executable by a virtual machine.

5. The method as recited in claim 1 wherein the second set of computer readable instructions are executable by a virtual machine.

6. The method as recited in claim 1 wherein the first set of computer readable instructions comprise intermediate language instructions and are executable by a first virtual machine and wherein the second set of computer readable instructions comprise a second intermediate language and are executable by a second virtual machine.

7. The method as recited in claim 1 wherein the type of the converted variable is determined from the operations that are performed on data pushed on a stack.

8. The method as recited in claim 1 wherein the type of the converted variable is determined from an instruction to load data into memory.

9. A computer readable storage medium bearing computer readable instruction for carrying out the acts comprising:
receiving a first set of computer readable instructions in a first, verifiable computer language, said first, verifiable computer language having variables;
determining the type of a converted variable for use in a second computer language that is not the same as the first computer language and that has a type determined from the operations performed by the first set of computer readable instructions; and
converting the first set of computer readable instructions from the first computer language that operate on the variables in the first computer language to a second set of computer readable instructions that operate on the converted variables in the second computer language wherein said converting comprises traversing the first set of computer readable instructions, merging local variables contained in said first set of computer readable instructions, fixing the types of the local variables and fixing the number of local variables wherein each local variable is associated with a most derived type and a least derived type and wherein merging two local variables comprises finding and selecting the most derived type within the least derived types and most derived types of said two local variables.

10. The computer readable medium of claim 9 wherein the set of first computer language comprises an intermediate language.

11. The computer readable medium of claim 10 wherein the intermediate language instructions comprise bytecodes.

12. The computer readable medium of claim 10 wherein the intermediate language instructions are executable by a virtual machine.

13. The computer readable medium of claim 9 wherein the second set of computer readable instructions are executable by a virtual machine.

14. The computer readable medium of claim 9 wherein the first set of computer readable instructions comprise intermediate language instructions and are executable by a first virtual machine and wherein the second set of computer readable instructions comprise a second intermediate language and are executable by a second virtual machine.

15. The computer readable medium of claim 9 wherein the converted variable is determined from the size of data pushed on a stack.

16. The computer readable medium of claim 9 wherein the converted variable is determined from an instruction to load data into memory.

17. A system for converting computer readable instructions, comprising:
a memory for storing a program comprising program code in a first intermediate language;
a processor for executing first computer instructions, when executed, the first computer instructions determining a converted variable for use in a second computer language that has a type determined from the operations performed by the stored program code in the first intermediate language; and
a processor for executing second computer instructions, when executed, the second computer instructions converting the set of computer readable instructions from the first intermediate language that operate on the variables in the first intermediate language to a second set of computer readable instructions that operate on the converted variables in a second computer language wherein the second computer language is not the first intermediate language and wherein the variables are converting by computer instructions that carry out the steps comprises traversing the program code in the first intermediate language, merging local variables contained in the program code in the first intermediate language, fixing the types of the local variables and fixing the number of local variables wherein each local variable is associated with a most derived type and a least derived type and wherein merging two local variables comprises finding and selecting the most derived type within the least derived types and most derived types of said two local variables.

18. The system as recited in claim 17 comprising a virtual machine for executing the second set of computer readable instructions.

19. The system as recited in claim 17 wherein the first intermediate language comprises bytecodes.

20. The system as recited in claim 19 wherein the bytecodes comprise Java byte codes.

21. The system as recited in claim 20 wherein the second computer language comprises an intermediate language that is not executable by a Java virtual machine.

22. The system as recited in claim 17 comprising transmitting the second set of computer readable instructions over a network for execution on a computing device.

23. The system as recited in claim 22 wherein the computing device comprises a virtual machine.

* * * * *